United States Patent [19]
Shorin

[11] Patent Number: 6,162,476
[45] Date of Patent: Dec. 19, 2000

[54] SUPPORTED CONFECTIONERY PRODUCT WITH A PRIZE

[75] Inventor: Arthur T. Shorin, New York, N.Y.

[73] Assignee: The Topps Company, Inc., New York, N.Y.

[21] Appl. No.: 09/215,990

[22] Filed: Dec. 18, 1998

Related U.S. Application Data

[63] Continuation-in-part of application No. 08/950,723, Oct. 15, 1997, abandoned.

[51] Int. Cl.[7] .................................................. A23G 3/00
[52] U.S. Cl. ......................... 426/134; 426/104; 220/4.23
[58] Field of Search ................................. 426/134, 110, 426/91, 104, 421; 220/4.22, 4.23

[56] References Cited

U.S. PATENT DOCUMENTS

| | | | |
|---|---|---|---|
| 174,162 | 2/1876 | Snow | 426/104 |
| 1,668,524 | 5/1928 | Bogue | 426/104 |
| 1,847,415 | 3/1932 | Snell | 426/134 |
| 1,971,560 | 8/1934 | Guyon | 426/134 |
| 2,156,482 | 5/1939 | Robb | 426/134 |
| 2,469,589 | 5/1949 | Barricini | 426/104 |
| 2,625,292 | 1/1953 | Spender | 220/4.22 |
| 3,122,441 | 2/1964 | Smith | 426/110 |
| 3,386,837 | 6/1968 | Arnot | 426/110 |
| 3,511,433 | 5/1970 | Andrews et al. | 220/4.23 |
| 4,229,482 | 10/1980 | Kreske | 426/134 |
| 4,244,470 | 1/1981 | Burnham | 220/4.23 |
| 4,294,299 | 10/1981 | Dorsen et al. | 220/4.23 |
| 4,417,613 | 11/1983 | Ryan et al. | 220/4.23 |
| 4,423,811 | 1/1984 | Knapp | 220/4.23 |
| 4,639,376 | 1/1987 | Saladino et al. | 426/91 |
| 4,732,273 | 3/1988 | Demarco | 426/110 |
| 4,840,276 | 6/1989 | George | 220/4.23 |
| 4,863,054 | 9/1989 | Capetta | 220/4.23 |
| 5,284,665 | 2/1994 | Molland | 426/110 |
| 5,302,403 | 4/1994 | Cook et al. | 426/104 |
| 5,324,527 | 6/1994 | Coleman | 426/110 |
| 5,370,884 | 12/1994 | Coleman | 426/110 |
| 5,503,857 | 4/1996 | Coleman et al. | 426/110 |

FOREIGN PATENT DOCUMENTS

| | | | |
|---|---|---|---|
| 337960 | 10/1989 | European Pat. Off. | 220/4.23 |
| 1047276 | 7/1953 | France | 426/104 |
| 2055469 | 5/1971 | France | 426/134 |
| 276904 | 7/1914 | Germany | 220/4.22 |
| 2324344 | 12/1974 | Germany | 426/132 |
| 3617093 | 10/1986 | Germany | 426/134 |
| 4141727 | 7/1993 | Germany | 426/134 |
| 1362764 | 8/1974 | United Kingdom | 426/134 |
| WO93/00267 | 1/1993 | WIPO | 426/132 |

*Primary Examiner*—Steven Weinstein
*Attorney, Agent, or Firm*—Mark T. Basseches; Barry G. Magidoff; Paul J. Sutton

[57] ABSTRACT

A novelty confectionery product having a prize includes first and second separable components forming a container including a handle and a stalk, the stalk projecting from the handle. The stalk includes a leg projecting from each component, the legs being encompassed within a solid confectionery portion which precludes separation of the legs and, hence, of the components. One of the two legs includes an end or terminus disposed closer to the surface of the confectionery portion than the other leg. The user need only remove increments of the confection to expose the shorter leg, thereby enabling separation of the legs and opening of the container while the remainder of the confectionery portion remains mounted on the longer leg.

8 Claims, 2 Drawing Sheets

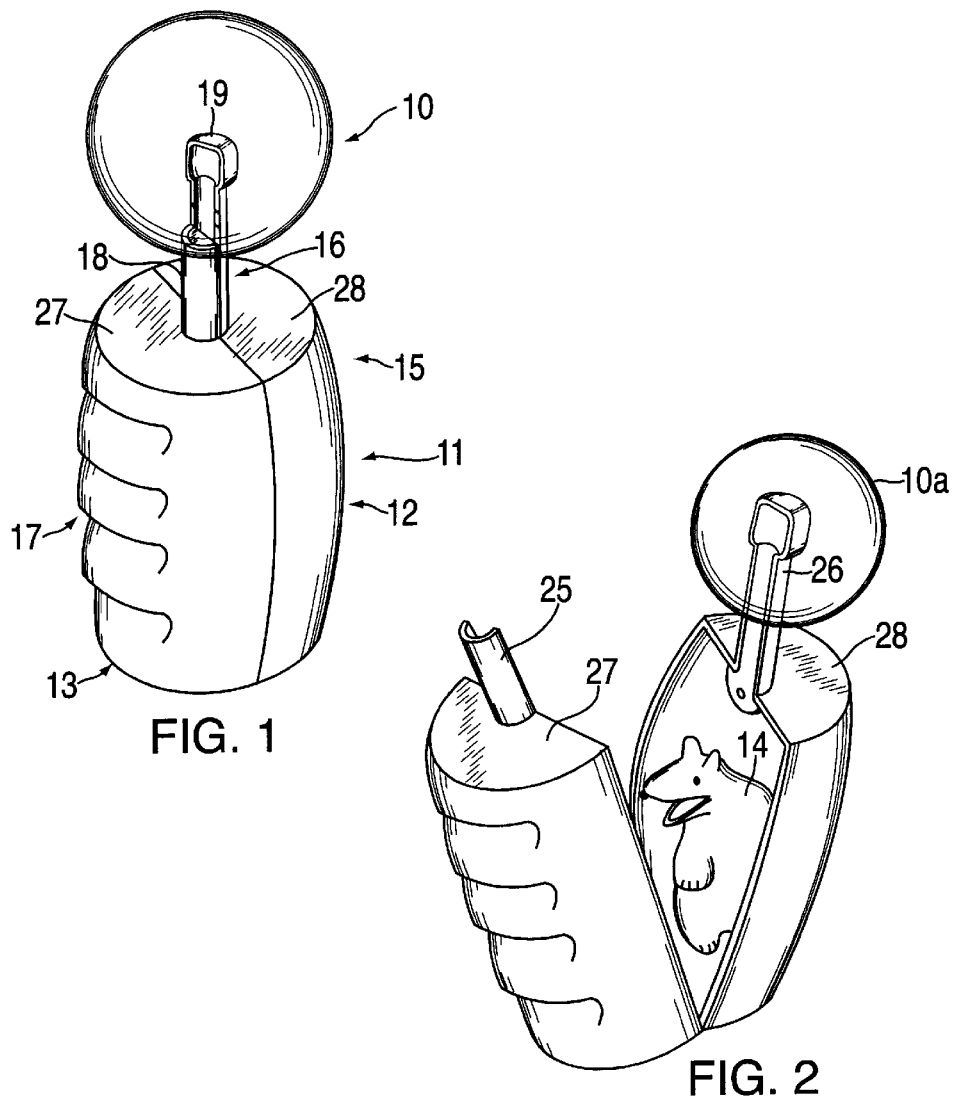
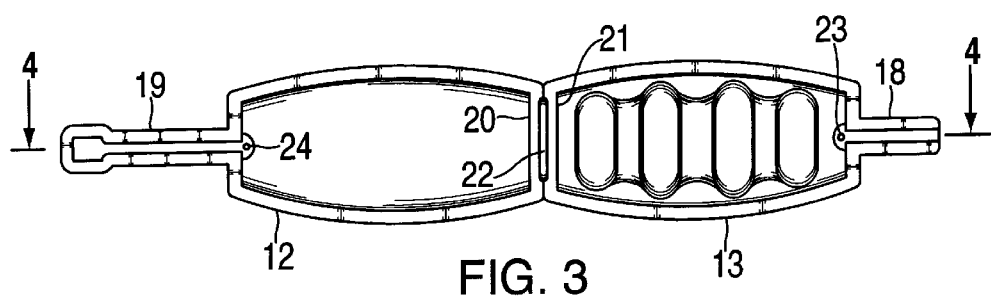

SUPPORTED CONFECTIONERY PRODUCT WITH A PRIZE

This application is continuation-in-part of U.S. patent application Ser. No. 08/950,723 filed Oct. 15, 1997, now abandoned.

BACKGROUND OF THE INVENTION

The present invention relates to a supported confectionery product wherein the support comprises a handle and contains an additional prize, or surprise, that is, an additional premium to be given to the purchaser of the confectionery product. Generally, such a prize is a small novelty product that will be of a size similar to that of the confectionery product.

The confectionery product on a stick, or lollipop, has long been a favorite of children, as well as adults. In addition to lollipops, which are generally comprised, at least in part, of hard or "glass" candy, sometimes with a chewy or liquid center, supported by an inedible handle, also include other confectionery products, such as frozen confections, ice cream or frozen yogurt, fruit ices, and chewy caramel products of various shapes and sizes. Generally, the handle is a relatively long stick, with the confectionery product enveloping, and supported by, one end of the stick. The other end of the stick serves as the handle for the person eating the confectionery product. Generally, once the confectionery product is fully consumed, the handle is discarded, as the handle is usually a substantially valueless material originally made of wood or rolled paper, but now often made of a rigid, food-grade plastic material.

It is also well known to so form the handles, or sticks, that they, themselves, constitute a premium incentive for the purchase of the confectionery product. For example, the handle or stick may be itself formed with ornamental features suitable for use as toys, such as is shown in U.S. Pat. Nos. 3,615,596, or 3,085,883. The handle for a confectionery product can itself also have a useful function, such as being a whistle or flute, as is shown in U.S. Pat. Nos. 2,617,324, or 1,609,791. In one interesting manifestation, a quiz game can be played where a question is presented on the exposed handle and the answer is presented on the covered portion of the stick and cannot be learned until the confection is eaten.

In addition, the handles have also been designed as a disposable package, to enclose an additional prize, such as is shown in U.S. Pat. No. 5,320,403. In somewhat more sophisticated devices, the handle for the confection, as in U.S. Pat. No. 4,914,748, comprises a flashlight, with the confection serving as an additional lens, when the confection is transparent or translucent. In U.S. Pat. No. 5,536,054, the handle is a power-driven motor which causes the confection at the end of the stick to move in various predetermined types of motions.

In none of these systems, however, is there provided a prize which can be hidden and at the same time is placed into a reusable container, thus providing, in effect, a double prize: the surprise within the container and the reusable container itself.

In U.S. Pat. No. 5,302,403, where the prize is hidden within the portion covered by the confection, in order to open the handle to remove the prize, the housing is substantially destroyed and cannot be reused.

German laid open application DE 4141727A-1 discloses a container comprised of two hingedly connected half shells. A confectionery portion encompasses an end of the shells, a food product or toy being enclosed in the shells. The shells may be opened to access the contents only after the confectionery portion is completely consumed.

A deficiency of the device of German disclosure resides in the fact that a consumer, normally a child, is eager to obtain the prize, and resents the necessity of consuming the entire confection portion, i.e. a hard candy, before the container can be opened.

There is clearly a need for a confectionery product which provides a container for a prize, and a confectionery portion limiting access to the container characterized in that only limited increments of the confectionery portion need be removed to enable the container to be opened. In the device of the invention, after a child partially consumes the confection, the container may be opened and the prize contained therein inspected. The child may then return the prize to the container while the remainder of the confection portion is consumed.

SUMMARY OF THE INVENTION

The present invention solves the deficiencies of the prior art in that it provides a premium housing to be sold as the handle and support for a confectionery product, which releasably encloses the premium in the handle portion and is reusable by the consumer of the confection as a permanent storage box for the premium. The premium may be accessed after only an increment of the confection is consumed. Thus, a child will be provided not only with a small toy, but also with a reusable container for storing the toy following partial or complete consumption of the confection, thus serving to teach the child an important lesson that everything has its place, and that the toy should be put away when playtime is over.

Specifically, the confectionery product comprises a pair of three dimensional shells which, when disposed in mouth to mouth relation, define an enlarged handle forming a premium or prize container and a narrow stalk forming a mounting place for the confection. The shells are preferably hinged or snap fittedly connected at positions remote from the stalk. A confectionery portion encompasses portions of the stalk to prevent separation of the shells.

An important feature of the invention resides in the stalk structure wherein the stalk comprises two legs namely an elongate leg and a short leg having an end portion spaced closer to the handle than the end of the elongate leg. The confection covers a greater extent of the long than the short leg whereby consumption of increments of the confection exposes the end portion of the short leg enabling the legs and hence the shell halves from which they project, to be separated. Users may thus access the prize while the bulk of the confection remains mounted on the long leg. Users may return the prize to and reclose the handle-container while portions of the confection still remain on the elongate leg.

BRIEF DESCRIPTION OF THE DRAWINGS

In the drawings which illustrate the preferred embodiments presently contemplated for carrying out the invention.

FIG. 1 is a perspective view of the confectionery product in the closed container forming condition thereof, showing a transparent lollipop-type confection in place.

FIG. 2 is a perspective view of the product of FIG. 1 after consumption of portions of the confection, in open condition and exposing a prize.

FIG. 3 is a top plan view of the embodiment of FIG. 2 in the fully opened position.

DETAILED DESCRIPTION OF THE PREFERRED EMBODIMENTS

Figure 4:
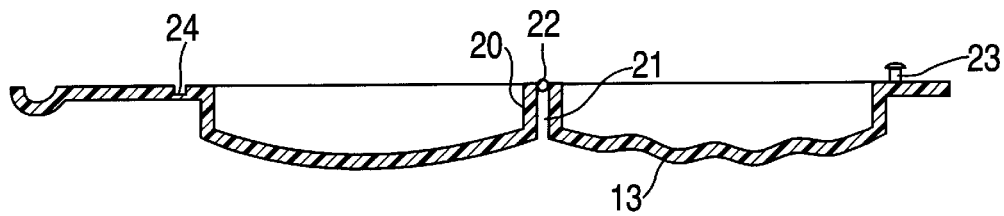
FIG. 4 is a vertical section taken on the lines 4—4 of FIG. 3.

Referring to the accompanying drawings, reference numerals are provided to indicate the relationships among the several parts. Corresponding numerals are consistent throughout the several Figures displayed in the drawings. Referring initially to FIG. 1, there is shown a novelty confectionery product, namely a confectionery portion 10 mounted on container 11. The Container 11 is comprised of two half-sections 12–13, which, in the closed condition of the device as shown in FIG. 1, may encompass a prize 14 (see FIG. 2).

The container 11 includes a handle portion 15 and a projecting stalk assembly 16. Preferably, the handle portion 15 includes an embossed or fluted area 17 for convenient gripping.

As best seen in FIG. 1, the confection 10, which preferably is comprised of a solid, such as lollipop candy, encompasses the two leg portions 18 and 19, which form the stalk 16. As will be appreciated form FIG. 1, since the confection 10 encompasses legs 18 and 19 of the container, the container halves 12–13 cannot be separated. Preferably, the base portions 20–21 of the container or handle halves 12–13 are linked by a hinge 22 integral with the halves. Preferably, the container, including the handle, stalk and hinge are integrally molded from polymer such as high-density polyethylene or polypropylene, polystyrene or ABS moldable polymers.

In the preferred embodiments illustrated, the two half components 12–13 are illustrated as comprising three-dimensional shells which are hingedly connected. It will be readily recognized that, without departing from the spirit of the invention, the parts could be formed one as a three dimensional element and the other as a flat element etc.

Optionally, the halves 12–13 may include complemental means for maintaining the halves in closed condition after the confectionery portion 10 has been partially or completely removed as will be described hereinafter. More particularly, part 13 may include a projecting pin 23 adapted to be snap fittedly or frictionally connected to a receiver aperture 24 on the part 12.

Figure 5:
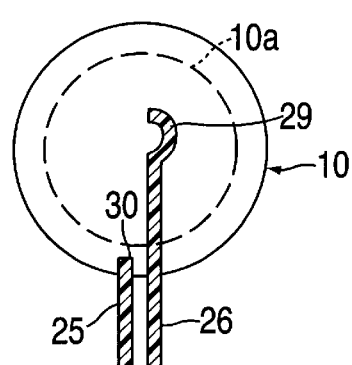
FIG. 5 is a fragmentary magnified view of a confection mounted on a stalk in accordance with the embodiment of FIGS. 1–4.

The stalk assembly 16 is comprised of a pair of legs 25–26 extending upwardly from the upper surfaces 27–28 of the handle halves 12–13 respectively. As best appreciated from FIGS. 1 and 5, the legs 25–26 in the closed (preconsumed) condition of the device are arrayed in parallel side by side condition. As is further apparent from the noted Figures, the end 29 of stalk component 26 extends further into the body of the confectionery portion 10 than does the end 30 of leg 25. As a result of the disparate lengths of legs 30 and 29, it will be apparent that when the confection portion 10 is partially consumed, i.e., to the dotted line condition shown in FIG. 5, the end 30 of leg 25 will no longer be embedded or encompassed in the reduced size confection portion 10a.

In FIG. 2, the confection 10a is shown in its reduced size configuration whereby the halves 12–13 may be separated, providing access to the prize 14, the remaining portions 10a of the confectionery being securely retained on the longer leg 26.

The child is thus able to access the prize 14 without the necessity of consuming the entirety of the confectionery portion. In addition, it is possible to re-close the halves 12–13 utilizing the hollow handle as a receptacle for the prize 14 or other articles of the child.

Figure 6:
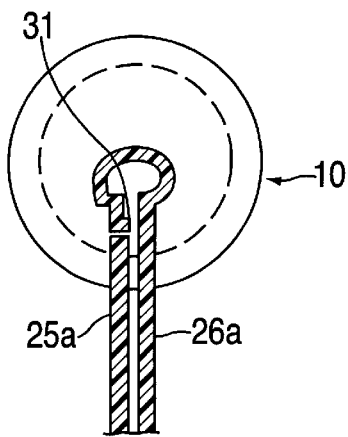
FIGS. 6 and 7 are views similar to FIG. 5 illustrating embodiments of the invention.
Figure 7:
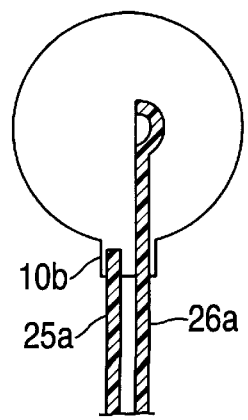

Referring next to FIGS. 6 and 7 there are shown two additional embodiments of stalk configuration. In FIG. 6, the longer stalk 26(a) is notched as at 31, the shorter leg 25(a) being nested within the notch 31.

In the device of FIG. 7, the shorter stalk 25(b) is covered only by a projecting lobe or thin collar of the confectionery portion. In the embodiment of FIG. 7, it will be apparent that only a very small portion or area, namely the collar 10b need be removed to clear the shorter leg 25b.

Optionally, the collared embodiment of FIG. 7 may be fabricated by dipping the stalk components 25b,26 deeply into the mold used for shaping the confection and thereafter partially retracting the stalk to its final position as shown in FIG. 7. This leaves a thin collar of confection on the increments of the legs 25b,26 which were initially immersed and thereafter withdrawn from the syrup used to form the confection.

As will be perceived from the preceding description, there is provided in accordance with the invention a novelty confectionery holder, including a confectionery retaining portion and a handle, the handle being hollow to contain a prize such as a toy, coupon, etc. The holder is comprised of two parts, which are hingedly, and/or snap fittedly connected, the confectionery portion locking the two parts in the closed or prize concealing condition. A characterizing feature of the invention resides in constructing the confectionery support such that only increments of the confection need be removed to enable the handle to be opened and the prize accessed.

As will be apparent to those skilled in the art and familiarized with the instant disclosure numerous structural variations may be made from the illustrated embodiments without departing from the spirit of the invention. Accordingly, the invention is to be broadly construed within the scope of the appended claims.

I claim:

1. A supported confectionery product comprising an openable and recloseable container formed of first and second parts, said container including a handle portion for holding the confectionery product and defined by said first and second parts and an elongate stalk projecting from said handle portion for forming a mounting place for the confectionery product, said stalk including a first leg extending from said first part and a second leg extending from said second part, said legs being arrayed in side-by-side condition when said container parts are closed said legs including ends spaced from said handle portion, said end of said second leg being spaced further from said handle portion than said end of said first leg, a prize in said handle portion of said container and a confectionery portion encompassing portions of both of said legs such that separation and opening of said first and second container parts and thus access to the prize is prevented, said confectionery portion including an exterior surface area in spaced relation to said handle, said end portion of said first leg being disposed closer to said exterior surface area than said end of said second leg, such that removal of increments of said confectionery portion to expose said end of said first leg so that it is no longer encompassed in the confectionery portion enables separation of said first and second parts of said container and thus opening of the container and access to the prize while the remaining portion of said confectionery portion remains mounted on said second leg.

2. A supported confectionery product in accordance with claim 1 wherein said first and second parts of said container comprise three-dimensional shells.

3. A supported confectionery product in accordance with claim 1 and including connection means extending between said first and second parts of said container for separably connecting said parts.

4. A supported confectionery product in accordance with claim 3 wherein said connection means comprise a hinge.

5. A supported confectionery product in accordance with claim 1 wherein said legs are arranged in parallel relation.

6. A supported confectionery product in accordance with claim 1 wherein said confectionery portion includes a thin collar extending toward said handle, said collar encompassing portions of said second leg and said first leg, said end of said first leg being disposed within said collar.

7. A supported confectionery product comprising a container and a confectionery portion, said container formed of two three-dimensional half shells having mouth portions and hinge means connecting said shells, said shells being movable about said hinge means between an open position and a closed position at which said mouth portions are in mutual engagement, said two half shells in said closed condition defining a handle portion for holding the confectionery product, a prize in said handle portion and a narrow elongate stalk extending from said handle portion for forming a mounting place for the confectionery product, said stalk comprising first and second side by side disposed legs wherein each leg extends from a respective half shell, one said leg having an end portion in spaced relation to said handle portion, the other said leg extending away from said handle portion a distance beyond said end portion and said confectionery portion being relatively rigid and mounted on said stalk spaced from said handle and encompassing portions of both of said legs such that said confectionery portion locks said shells in said closed position, said shells being separable about said hinge means to open the container and access the prize when sufficient parts of said confectionery portion are removed to expose said end portion of said one leg so that it is no longer encompassed in the confectionery portion while the remaining portion of said confectionery portion remains mounted on said other leg.

8. A supported confectionery product in accordance with claim 7 wherein said confectionery product includes a thin collar extending toward said handle, said collar encompassing portions of said second leg and said first leg, said end of said first leg being disposed within said collar.

* * * * *